(12) United States Patent
Yano et al.

(10) Patent No.: US 10,763,517 B2
(45) Date of Patent: Sep. 1, 2020

(54) STAINLESS STEEL SHEET FOR FUEL CELL SEPARATORS, AND PRODUCTION METHOD THEREFOR

(71) Applicant: JFE STEEL CORPORATION, Chiyoda-ku, Tokyo (JP)

(72) Inventors: Takayoshi Yano, Tokyo (JP); Shin Ishikawa, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 77 days.

(21) Appl. No.: 16/307,238

(22) PCT Filed: May 22, 2017

(86) PCT No.: PCT/JP2017/019088
§ 371 (c)(1),
(2) Date: Dec. 5, 2018

(87) PCT Pub. No.: WO2017/212905
PCT Pub. Date: Dec. 14, 2017

(65) Prior Publication Data
US 2019/0296369 A1    Sep. 26, 2019

(30) Foreign Application Priority Data

Jun. 10, 2016    (WO) ............... PCT/JP2016/068020
Nov. 15, 2016    (JP) ............................ 2016-222710

(51) Int. Cl.
*H01M 8/021*    (2016.01)
*C22C 38/50*    (2006.01)
(Continued)

(52) U.S. Cl.
CPC .............. *H01M 8/021* (2013.01); *C21D 1/26* (2013.01); *C21D 1/74* (2013.01); *C21D 1/76* (2013.01);
(Continued)

(58) Field of Classification Search
None
See application file for complete search history.

(56) References Cited

U.S. PATENT DOCUMENTS 8,440,029 B2    5/2013    Ide et al.
8,900,379 B2    12/2014   Ishikawa et al.
(Continued)

FOREIGN PATENT DOCUMENTS

CN    103975086 A    8/2014
CN    104011244 A    8/2014
(Continued)

OTHER PUBLICATIONS

Dec. 31, 2019, Office Action issued by the China National Intellectual Property Administration in the corresponding Chinese Patent Application No. 201780035837.1 with English language concise statement of relevance.
(Continued)

*Primary Examiner* — Sarah A. Slifka
(74) *Attorney, Agent, or Firm* — Kenja IP Law PC

(57) ABSTRACT

A stainless steel sheet for fuel cell separators comprises: a predetermined chemical composition; and fine precipitates containing Cr and Ti at a steel sheet surface, wherein an average equivalent circular diameter of the fine precipitates is 20 nm or more and 500 nm or less, and a number of the fine precipitates existing per 1 $\mu m^2$ at the steel sheet surface is three or more.

16 Claims, 3 Drawing Sheets

(51) Int. Cl.

| | | |
|---|---|---|
| *H01M 8/0254* | (2016.01) | |
| *H01M 8/1006* | (2016.01) | |
| *C21D 8/02* | (2006.01) | |
| *C22C 38/04* | (2006.01) | |
| *C22C 38/02* | (2006.01) | |
| *C21D 1/74* | (2006.01) | |
| *C21D 6/00* | (2006.01) | |
| *C21D 1/76* | (2006.01) | |
| *C21D 9/46* | (2006.01) | |
| *C22C 38/00* | (2006.01) | |
| *C21D 1/26* | (2006.01) | |
| *C25D 11/34* | (2006.01) | |
| *C22C 38/60* | (2006.01) | |
| *H01M 8/0228* | (2016.01) | |
| *C25F 3/06* | (2006.01) | |
| *H01M 8/1018* | (2016.01) | |
| *C22C 38/48* | (2006.01) | |
| *C22C 38/42* | (2006.01) | |
| *C22C 38/44* | (2006.01) | |
| *C22C 38/46* | (2006.01) | |
| *C22C 38/52* | (2006.01) | |

(52) U.S. Cl.
CPC ............ *C21D 6/004* (2013.01); *C21D 6/008* (2013.01); *C21D 8/0247* (2013.01); *C21D 9/46* (2013.01); *C22C 38/00* (2013.01); *C22C 38/02* (2013.01); *C22C 38/04* (2013.01); *C22C 38/50* (2013.01); *C22C 38/60* (2013.01); *C25D 11/34* (2013.01); *C25F 3/06* (2013.01); *H01M 8/0228* (2013.01); *H01M 8/0254* (2013.01); *H01M 8/1006* (2013.01); *C21D 6/007* (2013.01); *C22C 38/42* (2013.01); *C22C 38/44* (2013.01); *C22C 38/46* (2013.01); *C22C 38/48* (2013.01); *C22C 38/52* (2013.01); *H01M 2008/1095* (2013.01); *Y02P 70/56* (2015.11)

(56) References Cited

U.S. PATENT DOCUMENTS

| | | | |
|---|---|---|---|
| 9,777,344 B2 | 10/2017 | Kim et al. | |
| 2014/0294661 A1 | 10/2014 | Fukuda et al. | |
| 2014/0338796 A1* | 11/2014 | Kim | C21D 8/0263 148/507 |

FOREIGN PATENT DOCUMENTS

| | | |
|---|---|---|
| EP | 2787096 A1 | 10/2014 |
| EP | 2826878 A1 | 1/2015 |
| JP | H08180883 A | 7/1996 |
| JP | H10228914 A | 8/1998 |
| JP | 2000294255 A | 10/2000 |
| JP | 2000328200 A | 11/2000 |
| JP | 2004149920 A | 5/2004 |
| JP | 2005293982 A | 10/2005 |
| JP | 2006233282 A | 9/2006 |
| JP | 2007012634 A | 1/2007 |
| JP | 2008091225 A | 4/2008 |
| JP | 2012067391 A | 4/2012 |
| JP | 2012177157 A | 9/2012 |
| JP | 2015507091 A | 3/2015 |
| KR | 1020120024989 A | 3/2012 |
| WO | 2014050011 A1 | 4/2014 |

OTHER PUBLICATIONS

Oct. 9, 2019, Office Action issued by the China National Intellectual Property Administration in the corresponding Chinese Patent Application No. 201780035837.1 with English language search report.

Aug. 22, 2017, International Search Report issued in the International Patent Application No. PCT/JP2017/019088.

Feb. 21, 2018, Office Action issued by the Taiwan Intellectual Property Office in the corresponding Taiwanese Patent Application No. 106118688, with English language Concise Statement of Relevance.

Apr. 3, 2019, the Extended European Search Report issued by the European Patent Office in the corresponding European Patent Application No. 17810086.3.

R.A. Lula et al., Residual and Minor Elements in Stainless Steels, Handbook of Stainless Steels, Jan. 1, 1977, pp. 14-1 to 14-14, XP002430954.

May 1, 2020, Office Action issued by the Korean Intellectual Property Office in the corresponding Korean Patent Application No. 10-2018-7037998 with English language concise statement of relevance.

* cited by examiner

STAINLESS STEEL SHEET FOR FUEL CELL SEPARATORS, AND PRODUCTION METHOD THEREFOR

TECHNICAL FIELD

The present disclosure relates to a stainless steel sheet for fuel cell separators that has excellent contact electric resistance (hereafter also referred to as "contact resistance") and corrosion resistance, and a production method therefor.

BACKGROUND

In recent years, fuel cells that have excellent generation efficiency and emit no carbon dioxide are being developed for global environment protection. Such a fuel cell generates electricity from hydrogen and oxygen through an electrochemical reaction. The fuel cell has a sandwich-like basic structure, and includes an electrolyte membrane (ion-exchange membrane), two electrodes (fuel electrode and air electrode), gas diffusion layers of oxygen (air) and hydrogen, and two separators.

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells have, for example, the following advantages over other fuel cells.

(a) The fuel cell operating temperature is about 80° C., so that electricity can be generated at significantly low temperature.

(b) The fuel cell body can be reduced in weight and size.

(c) The fuel cell can be started promptly, and has high fuel efficiency and power density.

Polymer electrolyte fuel cells are therefore expected to be used as power sources in electric vehicles, home or industrial stationary generators, and portable small generators.

A polymer electrolyte fuel cell extracts electricity from hydrogen and oxygen via a polymer membrane. As illustrated in FIG. 1, a membrane-electrode joined body 1 is sandwiched between gas diffusion layers 2 and 3 (for example, carbon paper) and separators (bipolar plates) 4 and 5, forming a single component (a single cell). An electromotive force is generated between the separators 4 and 5.

The membrane-electrode joined body 1 is called a membrane-electrode assembly (MEA). The membrane-electrode joined body 1 is an assembly of a polymer membrane and an electrode material such as carbon black carrying a platinum catalyst on the front and back surfaces of the membrane, and has a thickness of several 10 μm to several 100 μm. The gas diffusion layers 2 and 3 are often integrated with the membrane-electrode joined body 1.

In the case of actually using polymer electrolyte fuel cells, several tens to hundreds of single cells such as the above are typically connected in series to form a fuel cell stack and put to use.

The separators 4 and 5 are required to function not only as (a) partition walls separating single cells, but also as
(b) conductors carrying generated electrons,
(c) air passages 6 through which oxygen (air) flows and hydrogen passages 7 through which hydrogen flows, and
(d) exhaust passages through which generated water or gas is exhausted (the air passages 6 or the hydrogen passages 7 also serve as the exhaust passages).

The separators therefore need to have excellent durability and electric conductivity.

Regarding durability, about 5000 hours are expected in the case of using the polymer electrolyte fuel cell as a power source in an electric vehicle, and about 40000 hours are expected in the case of using the polymer electrolyte fuel cell as a home stationary generator or the like. Since the proton conductivity of the polymer membrane (electrolyte membrane) decreases if metal ions are eluted due to corrosion, the separators need to be durable for long-term generation.

Regarding electric conductivity, the contact resistance between the separator and the gas diffusion layer is desirably as low as possible, because an increase in contact resistance between the separator and the gas diffusion layer causes lower generation efficiency of the polymer electrolyte fuel cell. A lower contact resistance between the separator and the gas diffusion layer contributes to better power generation property.

Polymer electrolyte fuel cells using graphite as separators have already been in practical use. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability and lower contact resistance.

For example, JP H8-180883 A (PTL 1) discloses a technique of using, as separators, a metal such as stainless steel or a titanium alloy that easily forms a passive film. With the technique disclosed in PTL 1, however, the formation of the passive film causes an increase in contact resistance, and leads to lower generation efficiency. The metal material disclosed in PTL 1 thus has problems such as high contact resistance as compared with the graphite material.

JP H10-228914 A (PTL 2) discloses a technique of plating the surface of a metal separator such as an austenitic stainless steel sheet (SUS304) with gold to reduce the contact resistance and ensure high output. However, gold plating incurs higher cost.

JP 2000-328200 A (PTL 3) and JP 2007-12634 A (PTL 4) disclose techniques of exposing a metal boride at the surface of stainless steel to reduce the contact resistance. These techniques, however, require the addition of a large amount of B, C, and the like as a steel component, so that workability decreases. Besides, since a large precipitate is exposed at the steel surface, cracking, rough surface, and the like tend to originate from the coarse precipitate when working the steel into a separator shape. Furthermore, the reduction in contact resistance is insufficient.

CITATION LIST

Patent Literatures

PTL 1: JP H8-180883 A
PTL 2: JP H10-228914 A
PTL 3: JP 2000-328200 A
PTL 4: JP 2007-12634 A

SUMMARY

Technical Problem

It could therefore be helpful to provide a stainless steel sheet for fuel cell separators that has excellent contact resistance and corrosion resistance and also has sufficient workability at low cost.

It could also be helpful to provide a production method for the stainless steel sheet for fuel cell separators.

Solution to Problem

We conducted extensive examination to improve contact resistance while ensuring various properties of a stainless steel sheet for fuel cell separators, in particular corrosion resistance and workability.

The stainless steel has a passive film at its surface. This passive film causes an increase in contact resistance when the stainless steel sheet is used as a fuel cell separator.

Hence, we first attempted to reduce the contact resistance in the following manner: Various precipitates are formed in the steel surface layer, and such precipitates are exposed at the steel surface, to bring the stainless steel sheet constituting a separator and a fuel cell component member such as a gas diffusion layer into contact with each other without the passive film therebetween.

We consequently discovered that an effective way of reducing the contact resistance while ensuring workability and corrosion resistance is to include Ti in the chemical composition of the steel sheet and use a precipitate containing Ti and Cr.

However, even with use of such a precipitate (hereafter also referred to as "Cr and Ti precipitate"), the contact resistance cannot be reduced satisfactorily in some cases.

Accordingly, we conducted further examination based on the above-mentioned discoveries, and discovered the following:

By finely and densely dispersing the Cr and Ti precipitates at the steel sheet surface, that is, by limiting the average equivalent circular diameter of the Cr and Ti precipitates at the steel sheet surface to 20 nm or more and 500 nm or less and the number of the precipitates existing per 1 $\mu m^2$ at the surface to three or more, the contact resistance can be further reduced while ensuring corrosion resistance and workability.

To control the precipitation form of the precipitates as stated above, it is important to control the chemical composition and the production conditions. In particular, it is important to include Ti in the chemical composition and optimize the annealing atmosphere.

To cause the precipitates to exist at the steel sheet surface, it is important to etch, by anodic electrolysis, the surface of an annealed sheet obtained as a result of annealing. Especially, by limiting the etching amount to a predetermined range through the total electric charge applied, the precipitates can be sufficiently exposed at the steel sheet surface, with it being possible to reduce the contact resistance more advantageously.

The reason why finely and densely dispersing the Cr and Ti precipitates at the steel sheet surface in the above-mentioned manner enables further reduction in contact resistance is considered as follows.

By finely and densely dispersing the Cr and Ti precipitates at the steel sheet surface, a current path not involving the passive film can be obtained uniformly and abundantly over the entire surface of the stainless steel sheet constituting a separator, as a result of which the contact resistance can be reduced considerably.

When the stainless steel sheet is put in an especially severe corrosive environment in practical use or subjected to heat treatment in a fuel cell stack production process, the passive film at the surface of the stainless steel sheet grows thick, and, in some cases, the passive film grows to such a thickness that can be regarded substantially as an oxide layer, and the contact resistance increases. We conducted further examination to maintain low contact resistance even in such cases.

We consequently discovered that, by increasing the atomic concentration of Cr existing in chemical form other than metal in the passive film at the steel sheet surface while keeping the fine precipitates exposed at the steel sheet surface, that is, by setting the ratio of the atomic concentration of Cr existing in chemical form other than metal to the atomic concentration of Fe existing in chemical form other than metal at the steel sheet surface to 2.0 or more, low contact resistance can be maintained more advantageously even in the case where the steel sheet is put in a severe corrosive environment or subjected to heat treatment in a fuel cell stack production process.

The reason for this is considered as follows. By increasing the atomic concentration of Cr existing in chemical form other than metal in the passive film at the steel sheet surface, the growth (thickening) of the passive film at the steel sheet surface is inhibited even when the steel sheet is exposed to the above-mentioned heat treatment environment, and as a result the exposure state of the Cr and Ti precipitates at the steel sheet surface is maintained favorably.

The present disclosure is based on these discoveries and further studies.

We thus provide:

1. A stainless steel sheet for fuel cell separators, comprising: a chemical composition containing (consisting of), in mass %, C: 0.003% to 0.030%, Si: 0.01% to 1.00%, Mn: 0.01% to 1.00%, P: 0.050% or less, S: 0.030% or less, Cr: 16.0% to 32.0%, Ni: 0.01% to 1.00%, Ti: 0.05% to 0.45%, Al: 0.001% to 0.200%, and N: 0.030% or less, with the balance being Fe and inevitable impurities; and fine precipitates containing Cr and Ti at a steel sheet surface, wherein an average equivalent circular diameter of the fine precipitates is 20 nm or more and 500 nm or less, and a number of the fine precipitates existing per 1 $\mu m^2$ at the steel sheet surface is three or more.

2. The stainless steel sheet for fuel cell separators according to 1., wherein the chemical composition further contains, in mass %, one or more selected from Mo: 0.01% to 2.50%, Cu: 0.01% to 0.80%, Co: 0.01% to 0.50%, and W: 0.01% to 3.00%.

3. The stainless steel sheet for fuel cell separators according to 1. or 2., wherein the chemical composition further contains, in mass %, one or more selected from Nb: 0.01% to 0.60%, Zr: 0.01% to 0.30%, V: 0.01% to 0.30%, Ca: 0.0003% to 0.0030%, Mg: 0.0005% to 0.0050%, B: 0.0003% to 0.0050%, REM (rare earth metal): 0.001% to 0.100%, Sn: 0.001% to 0.500%, and Sb: 0.001% to 0.500%.

4. The stainless steel sheet for fuel cell separators according to any of 1. to 3., wherein a ratio [Cr]/[Fe] of an atomic concentration of Cr existing in chemical form other than metal to an atomic concentration of Fe existing in chemical form other than metal at the steel sheet surface is 2.0 or more.

5. A production method for a stainless steel sheet for fuel cell separators, comprising: preparing a stainless steel sheet having the chemical composition according to any of 1. to 3., as a material; subjecting the stainless steel sheet to annealing, to obtain an annealed sheet; and subjecting the annealed sheet to anodic electrolysis, wherein an atmosphere in the annealing has a dew point of −35° C. or less and a nitrogen concentration of 1 vol % or more, and a total electric charge applied in the anodic electrolysis is 5 C/dm$^2$ to 60 C/dm$^2$.

6. The production method for a stainless steel sheet for fuel cell separators according to 5., further comprising after the anodic electrolysis, subjecting the annealed sheet to Cr condensation treatment, the Cr condensation treatment being immersion in an oxidizing solution or electrolysis in a potential range in which the stainless steel sheet is passivated.

Advantageous Effect

It is possible to obtain a stainless steel sheet for fuel cell separators that has excellent contact resistance while ensuring corrosion resistance and workability at low cost.

In particular, favorable contact resistance property can be maintained even in the case where the steel sheet is put in an especially severe corrosive environment in practical use or subjected to heat treatment in a fuel cell stack production process.

DETAILED DESCRIPTION

Figure 1:
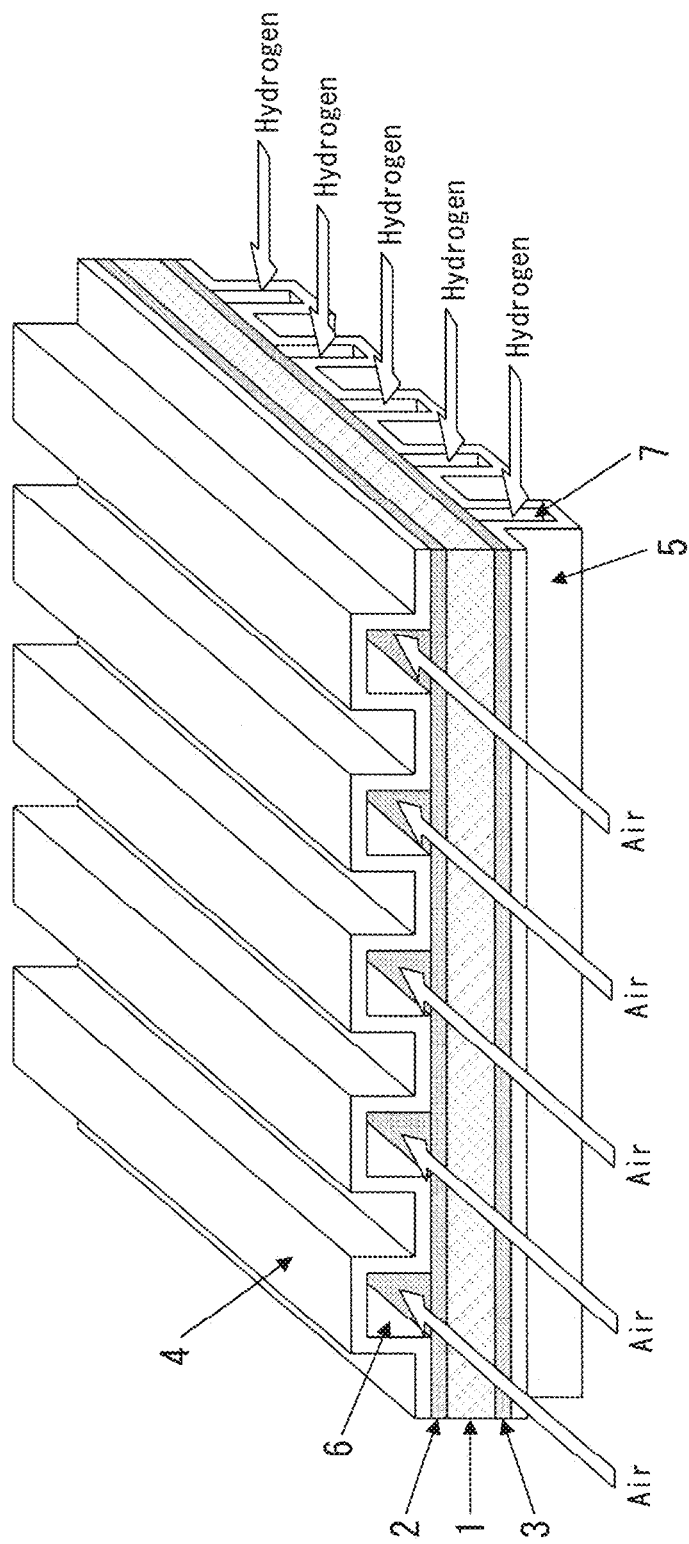
FIG. 1 is a schematic diagram illustrating the basic structure of a fuel cell.

A presently disclosed stainless steel sheet for fuel cell separators is described in detail below.
(1) Chemical Composition The reasons for limiting the chemical composition of the presently disclosed stainless steel sheet for fuel cell separators to the range described above are given below. While the unit of the content of each element in the chemical composition is "mass %," the unit is hereafter simply expressed by "%" unless otherwise specified.

C: 0.003% to 0.030%

Higher C content improves strength, and lower C content improves workability and corrosion resistance. To achieve sufficient strength, the C content needs to be 0.003% or more. If the C content is more than 0.030%, workability and corrosion resistance decrease markedly. The C content is therefore in a range of 0.003% to 0.030%. The C content is preferably 0.005% or more. The C content is preferably 0.020% or less, more preferably 0.015% or less, and further preferably 0.010% or less.

Si: 0.01% to 1.00%

Si is an element useful as a deoxidizer. This effect is achieved with a Si content of 0.01% or more. If the Si content is more than 1.00%, workability decreases markedly, and it is difficult to work the steel sheet into a separator. The Si content is therefore in a range of 0.01% to 1.00%. The Si content is preferably 0.10% or more. The Si content is preferably 0.50% or less, and more preferably 0.20% or less.

Mn: 0.01% to 1.00%

Mn has a deoxidation action. This effect is achieved with a Mn content of 0.01% or more. If the Mn content is more than 1.00%, workability and corrosion resistance decrease. The Mn content is therefore in a range of 0.01% to 1.00%. The Mn content is preferably 0.10% or more. The Mn content is preferably 0.25% or less, and more preferably 0.20% or less.

P: 0.050% or Less

P is an element that decreases corrosion resistance. Moreover, P segregates to crystal grain boundaries and thus decreases hot workability. Accordingly, the P content is desirably as low as possible, and is limited to 0.050% or less. The P content is preferably 0.040% or less. The P content is further preferably 0.030% or less. No lower limit is placed on the P content, yet the P content is preferably 0.005% or more because excessive dephosphorization incurs higher cost.

S: 0.030% or less

S accelerates the precipitation of MnS, and decreases corrosion resistance. Accordingly, the S content is desirably low, and is limited to 0.030% or less. The S content is preferably 0.010% or less. The S content is further preferably 0.004% or less. No lower limit is placed on the S content, yet the S content is preferably 0.001% or more because excessive desulfurization incurs higher cost.

Cr: 16.0% to 32.0%

Cr is an important element to ensure the corrosion resistance of the stainless steel. Cr is also an important element that forms a nitride, a carbide, a carbonitride, an oxide, or a mixture thereof during annealing to exist at the surface as a precipitate together with Ti, thus improving electric conductivity and reducing contact resistance. If the Cr content is less than 16.0%, corrosion resistance required of fuel cell separators cannot be obtained. If the Cr content is 16.0% or more while the Ti content is appropriately controlled as described below, a sufficient amount of fine precipitates containing Cr and Ti can be formed at the steel sheet surface, and as a result electric conductivity required of fuel cell separators can be obtained. If the Cr content is more than 32.0%, workability decreases. The Cr content is therefore in a range of 16.0% to 32.0%. The Cr content is preferably 18.0% or more, and more preferably 20.0% or more. The Cr content is preferably 26.0% or less, and more preferably 24.0% or less.

Ni: 0.01% to 1.00%

Ni is an element that effectively contributes to improved toughness and crevice corrosion resistance. This effect is achieved with a Ni content of 0.01% or more. If the Ni content is more than 1.00%, stress corrosion crack sensitivity increases. Besides, higher cost is incurred because Ni is an expensive element. The Ni content is therefore in a range of 0.01% to 1.00%. The Ni content is preferably 0.10% or more. The Ni content is preferably 0.50% or less, and more preferably 0.30% or less.

Ti: 0.05% to 0.45%

Ti is an important element that forms a nitride, a carbide, a carbonitride, an oxide, or a mixture thereof during annealing to exist at the surface as a precipitate together with Cr, thus improving electric conductivity and reducing contact resistance. In particular, since Ti nitride has high electric conductivity, contact resistance can be reduced effectively by causing such Ti nitride to exist at the steel surface as a fine precipitate containing Cr and Ti. This effect is achieved with a Ti content of 0.05% or more. If the Ti content is more than 0.45%, workability decreases. The Ti content is therefore in a range of 0.05% to 0.45%. The Ti content is preferably 0.10% or more, more preferably 0.15% or more, and further preferably 0.20% or more. The Ti content is preferably 0.40% or less, more preferably 0.35% or less, and further preferably 0.30% or less.

Al: 0.001% to 0.200%

Al is an element useful for deoxidation. This effect is achieved with a Al content of 0.001% or more. If the Al content is more than 0.200%, Al undergoes oxidation or nitriding preferentially during annealing, and a layer mainly composed of Al tends to form at the steel surface. This suppresses the formation of fine precipitates containing Cr and Ti. The Al content is therefore in a range of 0.001% to 0.200%. The Al content is preferably 0.010% or more, more preferably 0.020% or more, and further preferably 0.030% or more. The Al content is preferably 0.150% or less, more preferably 0.100% or less, and further preferably 0.050% or less.

N: 0.030% or Less

If the N content is more than 0.030%, corrosion resistance and workability decrease markedly. The N content is therefore 0.030% or less. The N content is preferably 0.020% or less. The N content is more preferably 0.015% or less. No lower limit is placed on the N content, yet the N content is preferably 0.003% or more because excessive denitriding incurs higher cost.

While the basic components have been described above, the presently disclosed stainless steel sheet for fuel cell separators may optionally contain the following elements as appropriate.

Mo: 0.01% to 2.50%

Mo stabilizes the passive film of the stainless steel and improves corrosion resistance. This effect is achieved with a Mo content of 0.01% or more. If the Mo content is more than 2.50%, workability decreases. Accordingly, in the case of containing Mo, the Mo content is in a range of 0.01% to 2.50%. The Mo content is preferably 0.50% or more, and more preferably 1.00% or more. The Mo content is preferably 2.00% or less.

Cu: 0.01% to 0.80%

Cu is an element that enhances corrosion resistance. This effect is achieved with a Cu content of 0.01% or more. If the Cu content is more than 0.80%, hot workability decreases. Accordingly, in the case of containing Cu, the Cu content is in a range of 0.01% to 0.80%. The Cu content is preferably 0.10% or more. The Cu content is preferably 0.60% or less. The Cu content is more preferably 0.45% or less.

Co: 0.01% to 0.50%

Co is an element that enhances corrosion resistance. This effect is achieved with a Co content of 0.01% or more. If the Co content is more than 0.50%, workability decreases. Accordingly, in the case of containing Co, the Co content is in a range of 0.01% to 0.50%. The Co content is preferably 0.10% or more. The Co content is preferably 0.30% or less.

W: 0.01% to 3.00%

W is an element that enhances corrosion resistance. This effect is achieved with a W content of 0.01% or more. If the W content is more than 3.00%, workability decreases. Accordingly, in the case of containing W, the W content is in a range of 0.01% to 3.00%. The W content is preferably 0.10% or more. The W content is preferably 0.80% or less, and more preferably 0.60% or less.

Nb: 0.01% to 0.60%

Nb is an element that combines with C and N to prevent excessive precipitation of Cr carbonitride in the steel and suppress a decrease in corrosion resistance (sensitization). These effects are achieved with a Nb content of 0.01% or more. If the Nb content is more than 0.60%, workability decreases. Accordingly, in the case of containing Nb, the Nb content is in a range of 0.01% to 0.60%. The Nb content is preferably 0.40% or less, and more preferably less than 0.20%.

Zr: 0.01% to 0.30%

Zr is an element that combines with C and N contained in the steel to suppress sensitization, as with Nb. This effect is achieved with a Zr content of 0.01% or more. If the Zr content is more than 0.30%, workability decreases. Accordingly, in the case of containing Zr, the Zr content is in a range of 0.01% to 0.30%. The Zr content is preferably 0.20% or less, more preferably 0.15% or less, and further preferably 0.10% or less.

V: 0.01% to 0.30%

V is an element that combines with C and N contained in the steel and suppresses a decrease in corrosion resistance (sensitization), as with Nb and Zr. This effect is achieved with a V content of 0.01% or more. If the V content is more than 0.30%, workability decreases. Accordingly, in the case of containing V, the V content is in a range of 0.01% to 0.30%. The V content is preferably 0.20% or less, more preferably 0.15% or less, and further preferably 0.10% or less.

Ca: 0.0003% to 0.0030%

Ca improves castability and enhances manufacturability. This effect is achieved with a Ca content of 0.0003% or more. If the Ca content is more than 0.0030%, Ca combines with S to form CaS, which causes a decrease in corrosion resistance. Accordingly, in the case of containing Ca, the Ca content is in a range of 0.0003% to 0.0030%. The Ca content is preferably 0.0005% or more. The Ca content is preferably 0.0020% or less.

Mg: 0.0005% to 0.0050%

Mg acts as a deoxidizer. This effect is achieved with a Mg content of 0.0005% or more. If the Mg content is more than 0.0050%, the toughness of the steel decreases, which can lead to a decrease in manufacturability. Accordingly, in the case of containing Mg, the Mg content is in a range of 0.0005% to 0.0050%. The Mg content is preferably 0.0020% or less.

B: 0.0003% to 0.0050%

B is an element that improves secondary working brittleness. This effect is achieved with a B content of 0.0003% or more. If the B content is more than 0.0050%, a B-containing precipitate forms and workability decreases. Accordingly, in the case of containing B, the B content is in a range of 0.0003% to 0.0050%. The B content is preferably 0.0005% or more. The B content is preferably 0.0030% or less.

REM (Rare Earth Metal): 0.001% to 0.100%

REM (rare earth metal: elements of atomic numbers 57 to 71 such as La, Ce, and Nd) is an element effective for deoxidation. This effect is achieved with a REM content of 0.001% or more. If the REM content is more than 0.100%, hot workability decreases. Accordingly, in the case of containing REM, the REM content is in a range of 0.001% to 0.100%. The REM content is preferably 0.010% or more. The REM content is preferably 0.050% or less.

Sn: 0.001% to 0.500%

Sn is an element effective in preventing occurrence of rough surface caused by working. This effect is achieved with a Sn content of 0.001% or more. If the Sn content is more than 0.500%, hot workability decreases. Accordingly, in the case of containing Sn, the Sn content is in a range of 0.001% to 0.500%. The Sn content is preferably 0.010% or more. The Sn content is preferably 0.200% or less.

Sb: 0.001% to 0.500%

Sb is an element effective in preventing occurrence of rough surface caused by working, as with Sn. This effect is achieved with a Sb content of 0.001% or more. If the Sb content is more than 0.500%, workability decreases. Accordingly, in the case of containing Sb, the Sb content is in a range of 0.001% to 0.500%. The Sb content is preferably 0.010% or more. The Sb content is preferably 0.200% or less.

The components other than those described above are Fe and inevitable impurities.

As described above, the presently disclosed stainless steel sheet for fuel cell separators preferably has a chemical composition that, in mass %, contains C: 0.003% to 0.030%, Si: 0.01% to 1.00%, Mn: 0.01% to 1.00%, P: 0.050% or less, S: 0.030% or less, Cr: 16.0% to 32.0%, Ni: 0.01% to 1.00%, Ti: 0.05% to 0.45%, Al: 0.001% to 0.200%, and N: 0.030% or less, optionally contains one or more selected from Mo: 0.01% to 2.50%, Cu: 0.01% to 0.80%, Co: 0.01% to 0.50%, and W: 0.01% to 3.00%, and optionally contains one or more selected from Nb: 0.01% to 0.60%, Zr: 0.01% to 0.30%, V: 0.01% to 0.30%, Ca: 0.0003% to 0.0030%, Mg: 0.0005% to 0.0050%, B: 0.0003% to 0.0050%, REM (rare earth metal): 0.001% to 0.100%, Sn: 0.001% to 0.500%, and Sb: 0.001% to 0.500%, with the balance being Fe and inevitable impurities.

(2) Fine Precipitate

It is very important that the presently disclosed stainless steel sheet for fuel cell separators has fine precipitates containing Cr and Ti at its steel sheet surface, the average equivalent circular diameter of the fine precipitates is 20 nm or more and 500 nm or less, and the number of the fine precipitates existing per 1 $\mu m^2$ at the steel sheet surface is three or more.

Fine precipitate at steel sheet surface: fine precipitate containing Cr and Ti

The fine precipitate at the steel sheet surface is a fine precipitate containing Cr and Ti. By sufficiently exposing the fine precipitates containing Cr and Ti at the steel sheet surface, the contact resistance can be reduced more advantageously.

Examples of the fine precipitate containing Cr and Ti include Cr and Ti nitride, carbide, carbonitride, and oxide, and mixtures thereof.

The components of the fine precipitate can be determined from an EDX spectrum obtained by peeling the fine precipitate from the steel sheet surface and analyzing the peeled fine precipitate using an energy-dispersive X-ray spectrometer (EDX) attached to a transmission electron microscope (TEM).

Average Equivalent Circular Diameter of Fine Precipitates: 20 nm or More and 500 nm or Less It is essential that the Cr and Ti precipitates are finely and densely dispersed at the steel sheet surface of the presently disclosed stainless steel sheet for fuel cell separators in order to reduce the contact resistance, as mentioned above. In detail, it is important that the average equivalent circular diameter of the fine precipitates is 20 nm or more and 500 nm or less.

If the average equivalent circular diameter is less than 20 nm, the precipitates are refined excessively, so that the precipitates are not sufficiently exposed at the steel sheet surface from the passive film. In such a case, sufficient contact between the precipitate and a fuel cell component member such as a gas diffusion layer cannot be achieved, and desired contact resistance cannot be obtained. If the average equivalent circular diameter is more than 500 nm, the precipitates cannot be finely and densely dispersed at the steel sheet surface, and desired contact resistance cannot be obtained. Besides, cracking, rough surface, and the like tend to originate from the precipitate when working the steel sheet into a desired separator shape.

Accordingly, the average equivalent circular diameter of the fine precipitates is 20 nm or more and 500 nm or less. The average equivalent circular diameter is preferably 30 nm or more, and more preferably 50 nm or more. The average equivalent circular diameter is preferably 200 nm or less, and more preferably 150 nm or less.

Number of Fine Precipitates Per 1 $\mu m^2$ at Steel Sheet Surface: Three or More It is also important that the number of the fine precipitates existing per 1 $\mu m^2$ at the steel sheet surface of the presently disclosed stainless steel sheet for fuel cell separators is three or more.

If the number of the fine precipitates per 1 $\mu m^2$ at the steel sheet surface is less than three, the electrical contact point between the stainless steel sheet for separators and a fuel cell component part such as a gas diffusion layer is insufficient, and desired contact resistance cannot be obtained. The number of the fine precipitates per 1 $\mu m^2$ at the steel sheet surface is therefore three or more. The number is preferably five or more. The number is more preferably ten or more.

The average equivalent circular diameter of the fine precipitates and the number of the fine precipitates per 1 $\mu m^2$ at the steel sheet surface can be determined as follows.

The steel sheet surface is observed for 10 observation fields with an accelerating voltage of 3 kV and a magnification of 30000 times, using a scanning electron microscope (FE-SEM) equipped with a cold-cathode field emission electron gun. The equivalent circular diameter of each precipitate observed in the resultant secondary electron image photograph (SEM photograph) is measured, and their average is calculated to find the average equivalent circular diameter of the fine precipitates. A lower limit of 10 nm is placed on the particle size (equivalent circular diameter) of the precipitates measured here.

In addition, the number of the precipitates whose particle sizes have been measured as mentioned above is counted and the number of the precipitates per 1 $\mu m^2$ is calculated for each observation field, and their average is calculated to find the number of the fine precipitates per 1 $\mu m^2$ at the steel sheet surface.

Ratio of Atomic Concentration of Cr Existing in Chemical Form Other than Metal to Atomic Concentration of Fe Existing in Chemical Form Other than Metal at Steel Sheet Surface: 2.0 or More By setting the ratio (hereafter also referred to as "[Cr]/[Fe]") of the atomic concentration of Cr existing in chemical form other than metal to the atomic concentration of Fe existing in chemical form other than metal at the surface of the stainless steel sheet to 2.0 or more, the growth of the passive film at the steel sheet surface is inhibited even in the case where the steel sheet is put in a severe corrosive environment or subjected to heat treatment in a fuel cell stack production process. Consequently, the exposure state of the Cr precipitates at the steel sheet surface is maintained, with it being possible to maintain low contact resistance. [Cr]/[Fe] is preferably 2.5 or more.

Higher [Cr]/[Fe] is more advantageous in terms of inhibiting the growth of the passive film at the steel sheet surface, and so no upper limit is placed on [Cr]/[Fe].

The "chemical form other than metal" denotes oxide and hydroxide. In detail, for Cr, examples include $CrO_2$, $Cr_2O_3$, CrOOH, $Cr(OH)_3$, and $CrO_3$. For Fe, examples include FeO, $Fe_3O_4$, $Fe_2O_3$, and FeOOH.

[Cr]/[Fe] can be determined as follows.

The surface of the stainless steel sheet is measured by X-ray photoelectron spectroscopy (hereafter also referred to as "XPS"), and the obtained peaks of Cr and Fe are separated into the peaks of Cr and Fe existing in metal chemical form and the peaks of Cr and Fe existing in chemical form other than metal. Dividing the atomic concentration of Cr existing in chemical form other than metal by the atomic concentration of Fe existing in chemical form other than metal calculated from the separated peaks yields [Cr]/[Fe].

In detail, a sample of 10 mm square was cut out of the steel sheet, and measured by an X-ray photoelectron spectrometer (AXIS-HS produced by Shimadzu/Kratos Co.) with an extraction angle of 45 degrees using a Al-Kα monochromatic X-ray source. The peaks of Cr and Fe are separated into the peaks of Cr and Fe existing in metal chemical form and the peaks of Cr and Fe existing in chemical form other than metal. Dividing the atomic concentration of Cr existing in chemical form other than metal by the atomic concentration of Fe existing in chemical form other than metal calculated from the separated peaks yields [Cr]/[Fe].

Peak separation is performed by removing the background of the spectrum by Shirley method and using a Gauss-Lorentz complex function (proportion of Lorentz function: 30%).

In this measurement, Cr atoms existing as precipitates at the steel sheet surface might be measured simultaneously. The inclusion of such Cr atoms existing as precipitates, however, poses no problem for the calculation of [Cr]/[Fe].

In terms of the fuel cell stack installation space and content weight, the sheet thickness of the stainless steel sheet for fuel cell separators is preferably in a range of 0.03 mm to 0.30 mm. If the sheet thickness is less than 0.03 mm, the production efficiency of the stainless steel sheet decreases. If the sheet thickness is more than 0.30 mm, the stack installation space and weight increases. The sheet thickness is more preferably 0.10 mm or less.

(3) Production Method

A presently disclosed production method for a stainless steel sheet for fuel cell separators is described below.

The presently disclosed production method for a stainless steel sheet for fuel cell separators includes: preparing a stainless steel sheet having the chemical composition described above as a material; subjecting the stainless steel sheet to annealing, to obtain an annealed sheet; and subjecting the annealed sheet to anodic electrolysis.

Each process is described below.

Preparation

The preparation involves preparing a stainless steel sheet as a material. The stainless steel sheet as a material is not limited as long as it has the chemical composition described above.

For example, a stainless steel sheet having the chemical composition described above can be prepared by hot rolling a steel slab having the chemical composition described above to obtain a hot rolled sheet, optionally hot band annealing the hot rolled sheet, thereafter cold rolling the hot rolled sheet to obtain a cold rolled sheet with a desired sheet thickness, and further optionally subjecting the cold rolled sheet to intermediate annealing.

The conditions of hot rolling, cold rolling, hot band annealing, intermediate annealing, and the like are not limited, and may comply with conventional methods.

Annealing

The annealing involves annealing the stainless steel sheet as a material prepared in the preparation to obtain an annealed sheet. It is important to use an atmosphere of a dew point of −40° C. or less and a nitrogen concentration of 1 vol % or more, in order to form desired fine precipitates near the steel sheet surface.

Dew Point: −35° C. or Less

The dew point in the annealing needs to be −35° C. or less. A higher dew point facilitates an oxidation reaction. In particular, if the dew point is more than −35° C., the oxide layer at the surface of the stainless steel sheet grows thick. This hinders the formation of the fine precipitates containing Cr and Ti, and makes it impossible to obtain desired contact resistance. Therefore, the dew point in the annealing needs to be −35° C. or less. The dew point is preferably −40° C. or less, and more preferably −45° C. or less.

Nitrogen Concentration: 1 Vol % or More

To form the fine precipitates containing Cr and Ti described above, the nitrogen concentration of the atmosphere gas needs to be 1 vol % or more. If the nitrogen concentration is less than 1 vol %, a necessary amount of fine precipitates containing Cr and Ti cannot be formed, and desired contact resistance cannot be obtained. The nitrogen concentration is preferably 5 vol % or more, and more preferably 20 vol % or more.

Examples of atmosphere gas that can be used besides nitrogen include hydrogen gas, argon gas, helium gas, carbon monoxide gas, carbon dioxide gas, and ammonia gas.

Mixed gas of nitrogen gas and hydrogen gas is suitable, and ammonia decomposition gas (hydrogen gas 75 vol %+nitrogen gas 25 vol %) is particularly suitable.

By increasing the annealing temperature, the number of the fine precipitates containing Cr and Ti can be increased. Moreover, the workability can be improved to ease working into a separator shape. However, if the annealing temperature is excessively high, the equivalent circular diameter of the fine precipitates coarsens, and desired contact resistance may be unable to be obtained. The annealing temperature is therefore preferably 800° C. to 1100° C. The annealing temperature is more preferably 850° C. or more. The annealing temperature is more preferably 1050° C. or less.

The annealing conditions other than the above may comply with conventional methods.

Anodic Electrolysis

Total Electric Charge Applied: 5 $C/dm^2$ to 60 $C/dm^2$

The anodic electrolysis involves subjecting the annealed sheet obtained in the annealing to anodic electrolysis. In the anodic electrolysis, it is important to appropriately control the etching amount so that the fine precipitates near the surface of the steel sheet formed by the annealing are exposed at the steel sheet surface without dropping off. The etching amount (the amount of the stainless steel sheet dissolved) is controlled by the total electric charge applied.

If the total electric charge applied is less than 5 $C/dm^2$, the fine precipitates are not sufficiently exposed at the steel sheet surface, which makes it difficult to obtain the desired contact resistance. If the total electric charge applied is more than 60

C/dm², the etching amount is excessively high, and the fine precipitates formed near the surface layer drop off, which makes it difficult to obtain the desired contact resistance. Therefore, the total electric charge applied in the anodic electrolysis is in a range of 5 C/dm² to 60 C/dm². The total electric charge applied is preferably 10 C/dm² or more, and more preferably 15 C/dm² or more. The total electric charge applied is preferably 40 C/dm² or less, and more preferably 25 C/dm² or less.

As an electrolytic solution, a sulfuric acid aqueous solution, a nitric acid aqueous solution, a phosphoric acid aqueous solution, a sodium sulfate aqueous solution, or the like is suitably used. The anodic electrolysis conditions other than the above are not limited as long as the total electric charge applied can be adjusted as described above, and may comply with conventional methods.

Condensation Treatment for Cr Existing in Chemical Form Other than Metal at Steel Sheet Surface After the anodic electrolysis, treatment (hereafter also referred to as "Cr condensation treatment") of condensing Cr existing in chemical form other than metal at the steel sheet surface, i.e. Cr existing in chemical form other than metal in the passive film, may be further performed. The Cr condensation treatment can increase the ratio ([Cr]/[Fe]) of the atomic concentration of Cr existing in chemical form other than metal to the atomic concentration of Fe existing in chemical form other than metal at the steel sheet surface.

Examples of the Cr condensation treatment include immersion in an oxidizing solution and electrolysis in a potential range in which the stainless steel sheet is passivated.

Examples of the oxidizing solution include a nitric acid aqueous solution and a hydrogen peroxide aqueous solution. A longer immersion time facilitates the condensation of Cr in the passive film. However, if the immersion time is excessively long, the effect is saturated and productivity decreases. Accordingly, the immersion time is preferably 1 min or more and 2 hr (120 min) or less.

In the case of using a nitric acid aqueous solution, the concentration of nitric acid is preferably 10 g/L to 400 g/L. The treatment temperature is not limited, but is preferably 30° C. to 60° C.

In the electrolysis, the potential may be adjusted to such a potential range in which the stainless steel sheet is passivated. In particular, it is preferable to adjust the potential to such a potential range in which components such as Fe and Ni other than Cr in the steel are dissolved and Cr is not dissolved.

The potential range (passivation area) in which the stainless steel sheet is passivated varies depending on the electrolytic solution used and the chemical composition of the stainless steel sheet. It is therefore preferable to adjust the potential in each case. For example, in the case of using a 50 g/L nitric acid aqueous solution, electrolysis is preferably performed in a potential range of 0.4 V to 0.8 V (vs. Ag/AgCl). A longer electrolysis time facilitates the condensation of Cr existing in chemical form other than metal in the passive film. However, if the electrolysis time is excessively long, the effect is saturated and productivity decreases. Accordingly, the electrolysis time is preferably 1 min or more and 2 hr (120 min) or less.

Other Treatments

Treatment of roughening the steel sheet surface may be performed before the annealing. By making the steel sheet surface rough beforehand, the contact resistance reduction effect can be further enhanced. For example, hydrofluoric acid aqueous solution immersion, shot blasting, or mechanical polishing is suitable.

EXAMPLES

Example 1

Cold rolled sheets of stainless steels of 0.08 mm in sheet thickness having the respective compositions listed in Table 1 were prepared, and subjected to annealing under the conditions listed in Table 2. In Table 2, the annealing temperature is the temperature measured at the steel sheet surface, and the annealing time is the residence time in a temperature range of "annealing temperature−10° C." to "annealing temperature".

After this, anodic electrolysis was performed in a 30 g/L sulfuric acid aqueous solution at a temperature of 40° C. so as to have the total electric charge applied listed in Table 2, thus obtaining a stainless steel sheet for separators. Here, sample No. 15 was not subjected to anodic electrolysis.

The contact resistance and corrosion resistance of each resultant stainless steel sheet for separators were evaluated as follows.

(1) Evaluation of Contact Resistance

Regarding the contact resistance, a sample was sandwiched between sheets of carbon paper (TGP-H-120 produced by Toray Industries, Inc.), and further contacted from both sides by Au plated Cu electrodes. A pressure of 0.98 MPa (=10 kg/cm²) per unit area was applied to cause current to flow, and the voltage difference between the electrodes was measured to calculate the electric resistance. The value obtained by multiplying the measured electric resistance by the area of the contact surface was taken to be the contact resistance value, and the contact resistance was evaluated based on the following criteria. The results are shown in Table 2.

Good: 30 mΩ·cm² or less
Poor: more than 30 mΩ·cm².

(2) Evaluation of Corrosion Resistance

Typically, stainless steel is more susceptible to transpassive dissolution and suffers greater degradation in corrosion resistance when the applied potential is higher. To evaluate the stability in the event of long exposure to high potential in a separator use environment, each sample was immersed in a sulfuric acid aqueous solution of a temperature of 80° C. and a pH of 3 and subjected to the application of a constant potential of 0.9 V (vs. SHE) for 20 hours using Ag/AgCl (saturated KCl aqueous solution) as a reference electrode, and the current density after 20 hours was measured. Based on the current density after 20 hours, the corrosion resistance was evaluated based on the following criteria. The results are shown in Table 2.

Good: 1 μA/cm² or less
Poor: more than 1 μA/cm².

The average equivalent circular diameter of the fine precipitates and the number of the fine precipitates per 1 μm² at the steel sheet surface were measured by the above-mentioned methods. S-4100 produced by Hitachi, Ltd. was used as a scanning electron microscope (FE-SEM) equipped with a cold-cathode field emission electron gun. The results are shown in Table 2.

Figure 2:
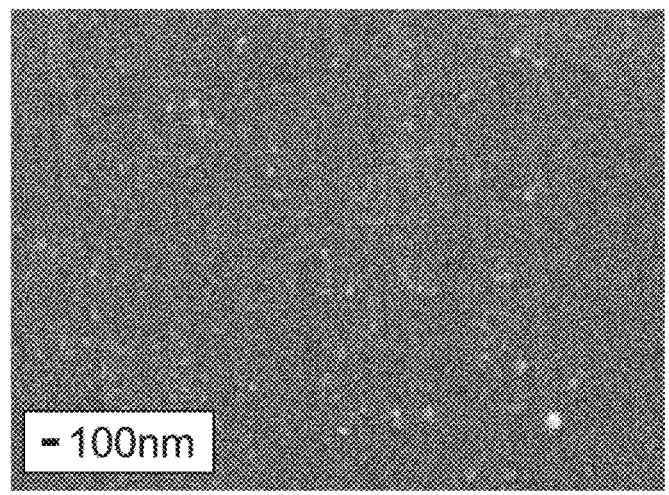
FIG. 2 is a diagram illustrating an example of a secondary electron image obtained by observing a steel sheet surface after annealing by a scanning electron microscope in sample No. 2 in the examples.
Figure 3:
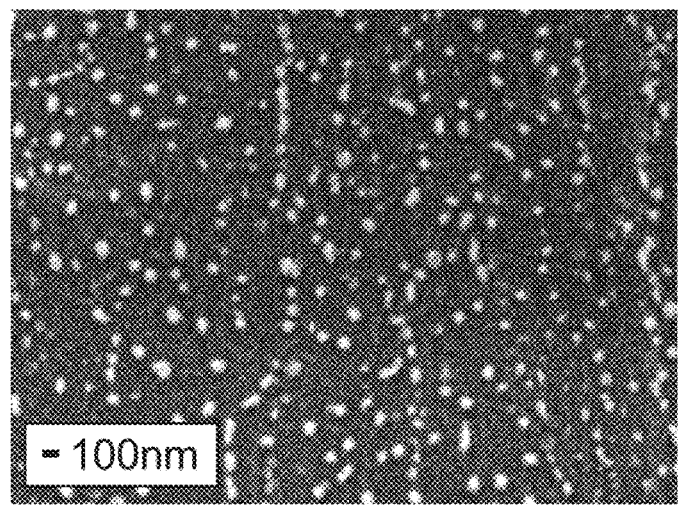
FIG. 3 is a diagram illustrating an example of a secondary electron image obtained by observing a steel sheet surface after anodic electrolysis by a scanning electron microscope in sample No. 2 in the examples.

For reference, FIG. 2 illustrates an example of a secondary electron image obtained by observing, by a scanning electron microscope equipped with a cold-cathode field emission electron gun, the steel sheet surface after annealing with an accelerating voltage of 3 kV and a magnification of 30000 times in sample No. 2, and FIG. 3 illustrates an example of a secondary electron image obtained by observing the steel sheet surface after anodic electrolysis in the same sample No. 2. As illustrated in FIGS. 2 and 3, the outlines (white color regions) of the fine precipitates were not clear and the fine precipitates were not sufficiently exposed from the passive film surface after the annealing (before the anodic electrolysis), but the fine precipitates were exposed after the anodic electrolysis.

Moreover, the exposed fine precipitates were peeled from the sample surface. The peeled fine precipitates were fixed to a Cu mesh by carbon vapor deposition, and analyzed using an energy-dispersive X-ray spectrometer (EDX) attached to a transmission electron microscope (TEM, JEM2010 produced by JEOL Ltd.). From the resultant EDX spectrum, the components of the exposed fine precipitates were determined. The results are shown in Table 2.

Figure 4:
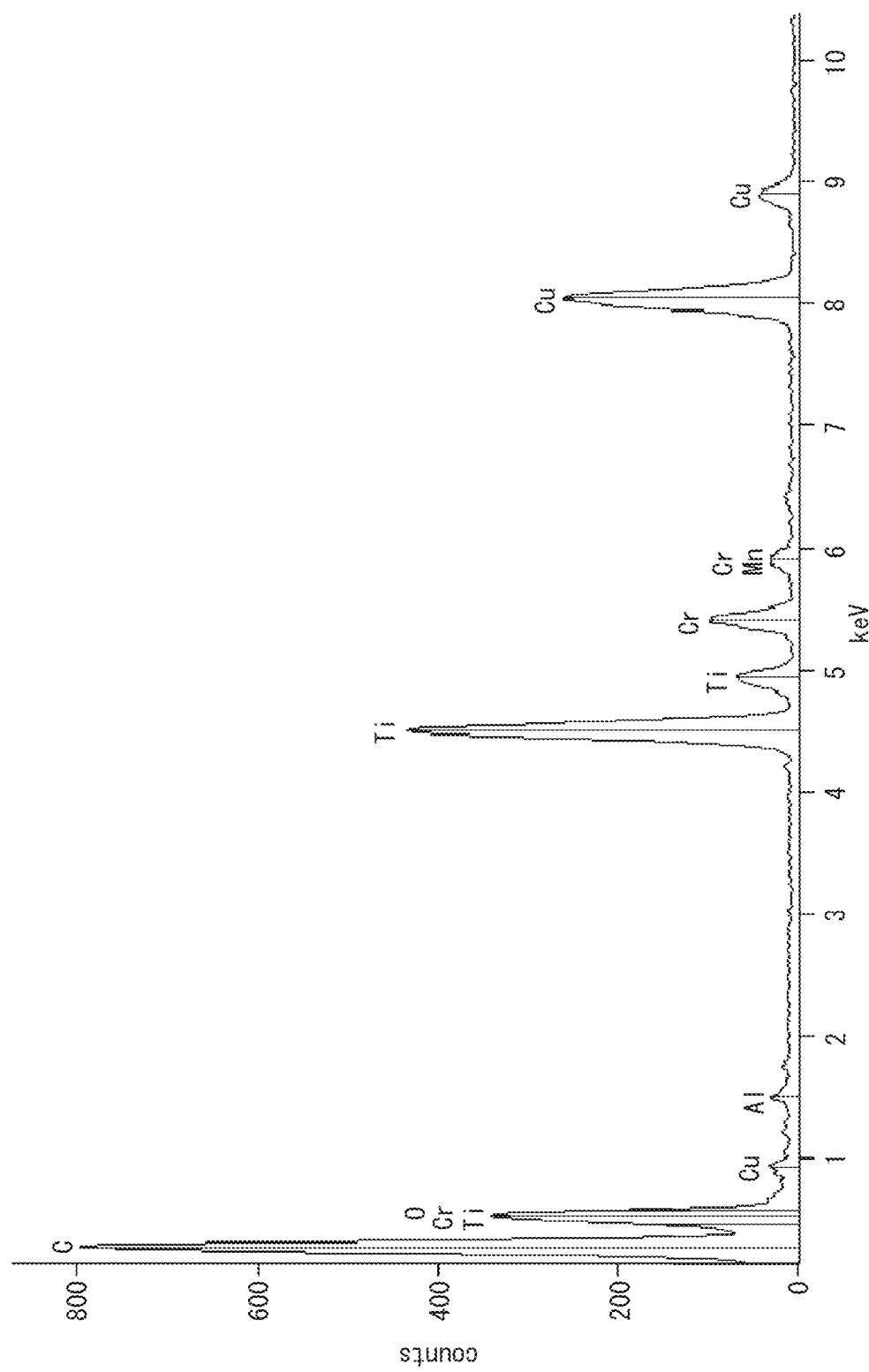
FIG. 4 is a diagram illustrating an example of an EDX spectrum of fine precipitates formed at the steel sheet surface after anodic electrolysis in sample No. 2 in the examples.

For reference, FIG. 4 illustrates an example of an EDX spectrum of the fine precipitates formed at the steel sheet surface after anodic electrolysis in sample No. 2. As illustrated in FIG. 4, the fine precipitates at the steel sheet surface contained Cr and Ti.

TABLE 1

| Steel sample ID | Chemical composition (mass %) | | | | | | | | | | | | | Remarks |
| --- | --- | --- | --- | --- | --- | --- | --- | --- | --- | --- | --- | --- | --- | --- |
| | C | Si | Mn | P | S | Cr | Ni | Ti | Al | N | Mo | Cu | Nb | Other components | |
| A | 0.007 | 0.18 | 0.15 | 0.028 | 0.002 | 20.9 | 0.19 | 0.31 | 0.032 | 0.011 | — | 0.44 | — | — | Conforming steel |
| B | 0.006 | 0.08 | 0.11 | 0.033 | 0.001 | 20.9 | 0.15 | 0.26 | 0.039 | 0.009 | — | — | — | — | Conforming steel |
| C | 0.012 | 0.12 | 0.17 | 0.021 | 0.003 | 21.0 | 0.13 | 0.33 | 0.033 | 0.011 | 0.53 | — | — | Co: 0.02, V: 0.04, Ca: 0.0004, B: 0.0005 | Conforming steel |
| D | 0.007 | 0.09 | 0.15 | 0.024 | 0.002 | 23.9 | 0.13 | 0.35 | 0.107 | 0.016 | 1.07 | — | 0.09 | — | Conforming steel |
| E | 0.004 | 0.20 | 0.16 | 0.027 | 0.009 | 25.8 | 0.27 | 0.10 | 0.072 | 0.013 | — | — | 0.14 | — | Conforming steel |
| F | 0.005 | 0.11 | 0.13 | 0.024 | 0.001 | 23.4 | 0.29 | 0.32 | 0.092 | 0.011 | 1.01 | 0.06 | 0.11 | W: 0.02, Zr: 0.03, Mg: 0.0009, REM: 0.003, Sn: 0.012, Sb: 0.025 | Conforming steel |
| G | 0.005 | 0.18 | 0.16 | 0.026 | 0.007 | 30.3 | 0.22 | <u>0.01</u> | 0.079 | 0.012 | 1.80 | — | 0.14 | — | Comparative steel |
| H | 0.007 | 0.13 | 0.12 | 0.029 | 0.002 | 20.6 | 0.24 | 0.28 | 0.174 | 0.010 | — | — | — | — | Conforming steel |
| I | 0.004 | 0.08 | 0.18 | 0.018 | 0.001 | 28.5 | 0.18 | 0.21 | 0.014 | 0.006 | — | — | — | — | Conforming steel |
| J | 0.008 | 0.07 | 0.10 | 0.029 | 0.003 | 17.8 | 0.32 | 0.26 | 0.039 | 0.009 | 1.12 | — | — | — | Conforming steel |
| K | 0.009 | 0.14 | 0.18 | 0.027 | 0.002 | 20.8 | 0.21 | 0.29 | 0.033 | 0.009 | 0.06 | 0.43 | — | V: 0.03, Ca: 0.0006, B: 0.0004 | Conforming steel |
| L | 0.008 | 0.11 | 0.19 | 0.031 | 0.001 | 20.6 | 0.14 | 0.28 | 0.028 | 0.008 | — | — | — | Co: 0.04, V: 0.05, Ca: 0.0008, B: 0.0008 | Conforming steel |
| M | 0.003 | 0.10 | 0.08 | 0.026 | 0.001 | 28.4 | 0.28 | <u>0.03</u> | 0.098 | 0.005 | — | — | — | — | Comparative steel |
| N | 0.021 | 0.58 | 0.55 | 0.025 | 0.001 | 20.8 | 0.52 | 0.32 | 0.031 | 0.011 | — | — | — | — | Conforming steel |

TABLE 2

| | | Sample production conditions | | | | | Fine precipitates at steel sheet surface | | |
| --- | --- | --- | --- | --- | --- | --- | --- | --- | --- |
| | | Annealing | | | | Anodic electrolysis | | | |
| Sample No. | Steel sample ID | Atmosphere gas composition | Dew point (° C.) | Annealing temperature (° C.) | Annealing time (sec) | Total electric charge applied (C/dm²) | Precipitate components | Average equivalent circular diameter (nm) | Number of fine precipitates per 1 μm² |
| 1 | A | hydrogen 75 vol % + nitrogen 25 vol % | −52 | 950 | 5 | 10 | Cr, Ti | 80 | 13 |
| 2 | A | hydrogen 75 vol % + nitrogen 25 vol % | −52 | 950 | 5 | 20 | Cr, Ti | 85 | 27 |
| 3 | A | hydrogen 75 vol % + nitrogen 25 vol % | −52 | 950 | 5 | 30 | Cr, Ti | 95 | 24 |
| 4 | A | hydrogen 75 vol % + nitrogen 25 vol % | −52 | 950 | 5 | 40 | Cr, Ti | 90 | 11 |
| 5 | B | hydrogen 75 vol % + nitrogen 25 vol % | −60 | 950 | 5 | 20 | Cr, Ti | 90 | 24 |
| 6 | C | hydrogen 90 vol % + nitrogen 10 vol % | −62 | 970 | 10 | 20 | Cr, Ti | 85 | 22 |
| 7 | D | hydrogen 75 vol % + nitrogen 25 vol % | −58 | 980 | 10 | 20 | Cr, Ti | 100 | 28 |
| 8 | E | hydrogen 75 vol % + nitrogen 25 vol % | −55 | 980 | 30 | 20 | Cr, Ti | 150 | 5 |
| 9 | F | hydrogen 75 vol % + nitrogen 25 vol % | −55 | 980 | 10 | 20 | Cr, Ti | 95 | 25 |
| 10 | <u>G</u> | hydrogen 75 vol % + nitrogen 25 vol % | −45 | 980 | 10 | 20 | Cr | 40 | <u>2</u> |
| 11 | N | hydrogen 75 vol % + nitrogen 25 vol % | −48 | 950 | 5 | 30 | Cr, Ti | 90 | 25 |
| 12 | A | <u>hydrogen100vol%</u> | −60 | 950 | 5 | 20 | — | — | <u>0</u> |
| 13 | A | hydrogen 75 vol % + nitrogen 25 vol % | −52 | 950 | 5 | <u>2.5</u> | Cr, Ti | 60 | <u>1</u> |
| 14 | A | hydrogen 75 vol % + nitrogen 25 vol % | −52 | 950 | 5 | <u>80</u> | — | — | <u>0</u> |
| 15 | A | hydrogen 75 vol % + nitrogen 25 vol % | −52 | 950 | 5 | <u>No</u> | Cr, Ti | 70 | <u>1</u> |
| 16 | H | hydrogen 95 vol % + nitrogen 5 vol % | −53 | 930 | 5 | 20 | Cr, Ti | 60 | 21 |
| 17 | I | hydrogen 75 vol % + nitrogen 25 vol % | −61 | 980 | 5 | 30 | Cr, Ti | 75 | 23 |
| 18 | J | hydrogen 75 vol % + nitrogen 25 vol % | −38 | 980 | 5 | 15 | Cr, Ti | 80 | 21 |
| 19 | K | hydrogen 75 vol % + nitrogen 25 vol % | −51 | 950 | 5 | 20 | Cr, Ti | 80 | 25 |
| 20 | L | hydrogen 95 vol % + nitrogen 5 vol % | −46 | 950 | 5 | 20 | Cr, Ti | 65 | 20 |
| 21 | <u>M</u> | hydrogen 75 vol % + nitrogen 25 vol % | −51 | 950 | 5 | 20 | <u>Cr</u> | 30 | <u>1</u> |
| 22 | B | hydrogen 75 vol % + nitrogen 25 vol % | <u>−33</u> | 920 | 5 | 10 | Cr, Ti | 70 | <u>2</u> |

TABLE 2-continued

| Sample No. | Evaluation result | | | | Remarks |
|---|---|---|---|---|---|
| | Contact resistance (mΩ · cm$^2$) | Determination | Corrosion resistance (μA/cm$^2$) | Determination | |
| 1 | 19.7 | Good | 0.17 | Good | Example |
| 2 | 14.5 | Good | 0.17 | Good | Example |
| 3 | 15.7 | Good | 0.17 | Good | Example |
| 4 | 16.1 | Good | 0.17 | Good | Example |
| 5 | 16.8 | Good | 0.19 | Good | Example |
| 6 | 17.3 | Good | 0.16 | Good | Example |
| 7 | 14.4 | Good | 0.15 | Good | Example |
| 8 | 28.6 | Good | 0.13 | Good | Example |
| 9 | 15.2 | Good | 0.15 | Good | Example |
| 10 | 35.4 | Poor | 0.13 | Good | Comparative Example |
| 11 | 15.6 | Good | 0.17 | Good | Example |
| 12 | 36.7 | Poor | 0.17 | Good | Comparative Example |
| 13 | 141.8 | Poor | 0.17 | Good | Comparative Example |
| 14 | 36.7 | Poor | 0.17 | Good | Comparative Example |
| 15 | 485.0 | Poor | 0.17 | Good | Comparative Example |
| 16 | 18.4 | Good | 0.17 | Good | Example |
| 17 | 16.4 | Good | 0.13 | Good | Example |
| 18 | 17.5 | Good | 0.25 | Good | Example |
| 19 | 16.3 | Good | 0.17 | Good | Example |
| 20 | 18.5 | Good | 0.17 | Good | Example |
| 21 | 36.8 | Poor | 0.13 | Good | Comparative Example |
| 22 | 31.1 | Poor | 0.17 | Good | Comparative Example |

The table reveals the following points.

(a) All Examples had desired contact resistance and corrosion resistance.

(b) In the samples of Comparative Examples No. 10 and 21, the Ti content was low. Consequently, the fine precipitates containing Cr and Ti were not sufficiently formed at the steel sheet surface, and desired contact resistance was not obtained.

(c) In the sample of Comparative Example No. 12, the atmosphere in the annealing did not contain nitrogen. Consequently, the fine precipitates containing Cr and Ti were not sufficiently formed, and desired contact resistance was not obtained.

(d) In the sample of Comparative Example No. 13, the total electric charge applied in the anodic electrolysis was insufficient. Consequently, the fine precipitates containing Cr and Ti were not sufficiently exposed at the steel sheet surface, and the number of the fine precipitates at the steel sheet surface was insufficient, so that desired contact resistance was not obtained.

(e) In the sample of Comparative Example No. 14, the total electric charge applied in the anodic electrolysis was excessively high. Consequently, the fine precipitates containing Cr and Ti dropped off the steel sheet surface, and desired contact resistance was not obtained.

(f) In the sample of Comparative Example No. 15, no anodic electrolysis was performed. Consequently, the fine precipitates containing Cr and Ti were not exposed at the steel sheet surface, and the number of the fine precipitates at the steel sheet surface was insufficient, so that desired contact resistance was not obtained.

(g) In the sample of Comparative Example No. 22, the dew point in the annealing was high. Consequently, the fine precipitates containing Cr and Ti were not sufficiently formed, and desired contact resistance was not obtained.

Example 2

Cold rolled sheets of stainless steels of 0.08 mm in sheet thickness having the respective compositions listed in Table 1 were prepared, and subjected to annealing under the conditions listed in Table 3. In Table 3, the annealing temperature is the temperature measured at the steel sheet surface, and the annealing time is the residence time in a temperature range of "annealing temperature−10° C." to "annealing temperature".

After this, anodic electrolysis was performed in a 30 g/L sulfuric acid aqueous solution at a temperature of 40° C. so as to have the total electric charge applied listed in Table 3. Here, sample No. 45 was not subjected to anodic electrolysis.

Subsequently, samples No. 24, 25, 28, 29, 32, 34, 36, 38, 40, 42, 44, 45, and 46 were each subjected to Cr condensation treatment in the passive film involving immersion in a 300 g/L nitric acid aqueous solution at a temperature of 60° C. for 6 min or 15 min, to obtain a stainless steel sheet for separators.

Samples No. 26 and 30 were each subjected to Cr condensation treatment in the passive film involving electrolysis under the conditions of temperature: 40° C., potential: 0.5 V (vs. Ag/AgCl), and electrolysis time: 1 min or 5 min using a 50 g/L nitric acid aqueous solution, to obtain a stainless steel sheet for separators. For each steel sample ID, an anode polarization curve in the electrolytic solution was measured, and the potential range in which the current density was 10 μA/cm$^2$ or less was taken to be a potential range (passivation area) in which the corresponding stainless steel sheet was passivated. For all stainless steel sheets having the chemical compositions of steel sample IDs A and B (samples No. 26 and 30), a potential of 0.5 V (vs. Ag/AgCl) was in a passivation area.

Each resultant stainless steel sheet for separators was subjected to evaluation of contact resistance and corrosion resistance (evaluation of contact resistance and corrosion resistance before heat treatment) in the same way as in Example 1. Moreover, each stainless steel sheet for separators was subjected to heat treatment of holding in an air atmosphere at 200° C. for 2 hr, assuming heat treatment in a fuel cell stack production process. Each resultant stainless steel sheet for separators was then subjected to evaluation of contact resistance and corrosion resistance (evaluation of contact resistance and corrosion resistance after heat treatment) in the same way as in Example 1. The results are shown in Table 3.

The evaluation criteria of the contact resistance before heat treatment and the contact resistance after heat treatment are as follows. The evaluation criteria of the corrosion resistance both before and after heat treatment are the same as the evaluation criteria of the corrosion resistance in Example 1.

Before Heat Treatment
Good: 30 mΩ·cm² or less
Poor: more than 30 mΩ·cm²
After Heat Treatment
Excellent: 20 mΩ·cm² or less
Good: more than 20 mΩ·cm² and 30 mΩ·cm² or less
Poor: more than 30 mΩ·cm².

In addition, the average equivalent circular diameter of the fine precipitates, the number of the fine precipitates per 1 μm² at the steel sheet surface, and the components of the fine precipitates were measured in the same way as in Example 1. The results are shown in Table 3.

Furthermore, the ratio[Cr]/[Fe] of the atomic concentration of Cr existing in chemical form other than metal to the atomic concentration of Fe existing in chemical form other than metal in the passive film was measured by the above-mentioned method. The results are shown in Table 3.

TABLE 3

| | | Sample production conditions | | | | |
|---|---|---|---|---|---|---|
| | | Annealing | | | | Anodic electrolysis Total electric |
| Sample No. | Steel sample ID | Atmosphere gas composition | Dew point (° C.) | Annealing temperature (° C.) | Annealing time (sec) | charge applied (C/dm²) |
| 23 | A | hydrogen 75 vol % + nitrogen 25 vol % | −52 | 950 | 5 | 20 |
| 24 | | hydrogen 75 vol % + nitrogen 25 vol % | −52 | 950 | 5 | 20 |
| 25 | | hydrogen 75 vol % + nitrogen 25 vol % | −52 | 950 | 5 | 20 |
| 26 | | hydrogen 75 vol % + nitrogen 25 vol % | −52 | 950 | 5 | 20 |
| 27 | B | hydrogen 75 vol % + nitrogen 25 vol % | −60 | 950 | 5 | 20 |
| 28 | | hydrogen 75 vol % + nitrogen 25 vol % | −60 | 950 | 5 | 20 |
| 29 | | hydrogen 75 vol % + nitrogen 25 vol % | −60 | 950 | 5 | 20 |
| 30 | | hydrogen 75 vol % + nitrogen 25 vol % | −60 | 950 | 5 | 20 |
| 31 | C | hydrogen 90 vol % + nitrogen 10 vol % | −62 | 970 | 10 | 20 |
| 32 | | hydrogen 90 vol % + nitrogen 10 vol % | −62 | 970 | 10 | 20 |
| 33 | D | hydrogen 75 vol % + nitrogen 25 vol % | −58 | 980 | 10 | 20 |
| 34 | | hydrogen 75 vol % + nitrogen 25 vol % | −58 | 980 | 10 | 20 |
| 35 | F | hydrogen 75 vol % + nitrogen 25 vol % | −55 | 980 | 10 | 20 |
| 36 | | hydrogen 75 vol % + nitrogen 25 vol % | −55 | 980 | 10 | 20 |
| 37 | H | hydrogen 95 vol % + nitrogen 5 vol % | −53 | 930 | 5 | 20 |
| 38 | | hydrogen 95 vol % + nitrogen 5 vol % | −53 | 930 | 5 | 20 |
| 39 | J | hydrogen 75 vol % + nitrogen 25 vol % | −38 | 980 | 5 | 20 |
| 40 | | hydrogen 75 vol % + nitrogen 25 vol % | −38 | 980 | 5 | 20 |
| 41 | K | hydrogen 75 vol % + nitrogen 25 vol % | −51 | 950 | 5 | 20 |
| 42 | | hydrogen 75 vol % + nitrogen 25 vol % | −51 | 950 | 5 | 20 |
| 43 | L | hydrogen 95 vol % + nitrogen 5 vol % | −46 | 950 | 5 | 20 |
| 44 | | hydrogen 95 vol % + nitrogen 5 vol % | −46 | 950 | 5 | 20 |
| 45 | A | hydrogen 75 vol % + nitrogen 25 vol % | −52 | 950 | 5 | No electrolysis |
| 46 | N | hydrogen 75 vol % + nitrogen 25 vol % | −48 | 950 | 5 | 30 |

| | Sample production conditions Cr condensation treatment in passive film | | |
|---|---|---|---|
| Sample No. | Treatment method | Immersion time or electrolysis time (min) | Remarks |
| 23 | — | — | Example |
| 24 | Immersion | 6 | Example |
| 25 | Immersion | 15 | Example |
| 26 | Electrolysis | 1 | Example |
| 27 | — | — | Example |
| 28 | Immersion | 6 | Example |
| 29 | Immersion | 15 | Example |
| 30 | Electrolysis | 5 | Example |
| 31 | — | — | Example |
| 32 | Immersion | 15 | Example |
| 33 | — | — | Example |
| 34 | Immersion | 15 | Example |
| 35 | — | — | Example |
| 36 | Immersion | 15 | Example |
| 37 | — | — | Example |
| 38 | Immersion | 15 | Example |
| 39 | — | — | Example |
| 40 | Immersion | 15 | Example |
| 41 | — | — | Example |
| 42 | Immersion | 15 | Example |

TABLE 3-continued

| | | | | |
|---|---|---|---|---|
| 43 | — | — | | Example |
| 44 | Immersion | 15 | | Example |
| 45 | Immersion | 6 | | Comparative Example |
| 46 | Immersion | 15 | | Example |

| | | Fine precipitates at steel sheet surface | | | Evaluation result Before heat treatment | | | |
|---|---|---|---|---|---|---|---|---|
| | | Average equivalent circular diameter (nm) | Number of fine precipitates per 1 μm² | Passive film [Cr]/[Fe] | Contact resistance | | Corrosion resistance | |
| Sample No. | Precipitate components | | | | Contact resistance value (mΩ·cm²) | Determination | Current density (μA/cm²) | Determination |
| 23 | Cr, Ti | 85 | 27 | 1.8 | 14.5 | Good | 0.17 | Good |
| 24 | Cr, Ti | 85 | 26 | 2.7 | 15.3 | Good | 0.16 | Good |
| 25 | Cr, Ti | 90 | 25 | 2.8 | 15.4 | Good | 0.15 | Good |
| 26 | Cr, Ti | 80 | 26 | 2.1 | 15.0 | Good | 0.16 | Good |
| 27 | Cr, Ti | 90 | 24 | 1.8 | 16.8 | Good | 0.19 | Good |
| 28 | Cr, Ti | 95 | 24 | 2.5 | 17.2 | Good | 0.18 | Good |
| 29 | Cr, Ti | 90 | 24 | 2.7 | 17.4 | Good | 0.17 | Good |
| 30 | Cr, Ti | 90 | 25 | 2.3 | 17.0 | Good | 0.17 | Good |
| 31 | Cr, Ti | 85 | 22 | 1.8 | 17.3 | Good | 0.16 | Good |
| 32 | Cr, Ti | 80 | 20 | 2.8 | 17.9 | Good | 0.15 | Good |
| 33 | Cr, Ti | 100 | 28 | 1.9 | 14.4 | Good | 0.15 | Good |
| 34 | Cr, Ti | 95 | 26 | 3.3 | 15.3 | Good | 0.14 | Good |
| 35 | Cr, Ti | 95 | 25 | 1.9 | 15.2 | Good | 0.15 | Good |
| 36 | Cr, Ti | 90 | 23 | 3.2 | 16.1 | Good | 0.14 | Good |
| 37 | Cr, Ti | 60 | 21 | 1.8 | 18.4 | Good | 0.17 | Good |
| 38 | Cr, Ti | 65 | 22 | 2.7 | 18.9 | Good | 0.16 | Good |
| 39 | Cr, Ti | 80 | 21 | 1.6 | 17.5 | Good | 0.25 | Good |
| 40 | Cr, Ti | 85 | 23 | 2.2 | 17.9 | Good | 0.23 | Good |
| 41 | Cr, Ti | 80 | 25 | 1.8 | 16.3 | Good | 0.17 | Good |
| 42 | Cr, Ti | 80 | 24 | 2.8 | 16.9 | Good | 0.15 | Good |
| 43 | Cr, Ti | 65 | 20 | 1.7 | 18.3 | Good | 0.17 | Good |
| 44 | Cr, Ti | 60 | 22 | 2.6 | 18.7 | Good | 0.16 | Good |
| 45 | Cr, Ti | 70 | <u>1</u> | 2.3 | 825.7 | Poor | 0.16 | Good |
| 46 | Cr, Ti | 90 | 25 | 2.9 | 15.3 | Good | 0.15 | Good |

| | Evaluation result After heat treatment | | | | |
|---|---|---|---|---|---|
| | Contact resistance | | Corrosion resistance | | |
| Sample No. | Contact resistance value (mΩ·cm²) | Determination | Current density (μA/cm²) | Determination | Remarks |
| 23 | 22.9 | Good | 0.15 | Good | Example |
| 24 | 19.5 | Excellent | 0.15 | Good | Example |
| 25 | 19.1 | Excellent | 0.14 | Good | Example |
| 26 | 19.7 | Excellent | 0.14 | Good | Example |
| 27 | 23.1 | Good | 0.18 | Good | Example |
| 28 | 19.6 | Excellent | 0.17 | Good | Example |
| 29 | 19.4 | Excellent | 0.16 | Good | Example |
| 30 | 19.7 | Excellent | 0.17 | Good | Example |
| 31 | 23.3 | Good | 0.14 | Good | Example |
| 32 | 19.8 | Excellent | 0.14 | Good | Example |
| 33 | 22.7 | Good | 0.13 | Good | Example |
| 34 | 18.0 | Excellent | 0.13 | Good | Example |
| 35 | 22.9 | Good | 0.14 | Good | Example |
| 36 | 18.8 | Excellent | 0.13 | Good | Example |
| 37 | 23.6 | Good | 0.15 | Good | Example |
| 38 | 19.7 | Excellent | 0.15 | Good | Example |
| 39 | 23.5 | Good | 0.21 | Good | Example |
| 40 | 19.7 | Excellent | 0.19 | Good | Example |
| 41 | 23.0 | Good | 0.16 | Good | Example |
| 42 | 19.4 | Excellent | 0.14 | Good | Example |
| 43 | 23.6 | Good | 0.16 | Good | Example |
| 44 | 19.7 | Excellent | 0.15 | Good | Example |
| 45 | 884.2 | Poor | 0.15 | Good | Comparative Example |
| 46 | 19.2 | Excellent | 0.14 | Good | Example |

The table reveals the following points.

(a) All Examples had desired contact resistance and corrosion resistance.

(b) Particularly in Examples No. 24, 25, 26, 28, 29, 30, 32, 34, 36, 38, 40, 42, 44, and 46 subjected to the Cr condensation treatment in the passive film so that the ratio [Cr]/[Fe] of the atomic concentration of Cr existing in chemical form other than metal to the atomic concentration of Fe existing in chemical form other than metal at the steel sheet surface was 2.0 or more, especially excellent contact resistance was exhibited even after heat treatment.

(c) In the sample of Comparative Example No. 45, no anodic electrolysis was performed. Consequently, the fine precipitates containing Cr were not exposed at the steel sheet surface, and the number of the fine precipitates at the steel sheet surface was insufficient, so that desired contact resistance was not obtained.

REFERENCE SIGNS LIST 1 membrane-electrode joined body
2, 3 gas diffusion layer
4, 5 separator
6 air passage
7 hydrogen passage

The invention claimed is:

1. A stainless steel sheet for fuel cell separators, comprising:
    a chemical composition containing, in mass %,
    C: 0.003% to 0.030%,
    Si: 0.01% to 1.00%,
    Mn: 0.01% to 1.00%,
    P: 0.050% or less,
    S: 0.030% or less,
    Cr: 16.0% to 32.0%,
    Ni: 0.01% to 1.00%,
    Ti: 0.05% to 0.45%,
    Al: 0.001% to 0.200%, and
    N: 0.030% or less,
    with the balance being Fe and inevitable impurities; and
    fine precipitates containing Cr and Ti at a steel sheet surface,
    wherein an average equivalent circular diameter of the fine precipitates is 20 nm or more and 500 nm or less, and a number of the fine precipitates existing per 1 µm$^2$ at the steel sheet surface is three or more.

2. The stainless steel sheet for fuel cell separators according to claim 1,
    wherein the chemical composition further contains, in mass %, one or more selected from
    Mo: 0.01% to 2.50%,
    Cu: 0.01% to 0.80%,
    Co: 0.01% to 0.50%, and
    W: 0.01% to 3.00%.

3. The stainless steel sheet for fuel cell separators according to claim 2,
    wherein the chemical composition further contains, in mass %, one or more selected from
    Nb: 0.01% to 0.60%,
    Zr: 0.01% to 0.30%,
    V: 0.01% to 0.30%,
    Ca: 0.0003% to 0.0030%,
    Mg: 0.0005% to 0.0050%,
    B: 0.0003% to 0.0050%,
    REM: 0.001% to 0.100%,
    Sn: 0.001% to 0.500%, and
    Sb: 0.001% to 0.500%.

4. The stainless steel sheet for fuel cell separators according to claim 3,
    wherein a ratio [Cr]/[Fe] of an atomic concentration of Cr existing in chemical form other than metal to an atomic concentration of Fe existing in chemical form other than metal at the steel sheet surface is 2.0 or more.

5. A production method for a stainless steel sheet for fuel cell separators, comprising:
    preparing a stainless steel sheet having the chemical composition according to claim 3, as a material;
    subjecting the stainless steel sheet to annealing, to obtain an annealed sheet; and
    subjecting the annealed sheet to anodic electrolysis,
    wherein an atmosphere in the annealing has a dew point of −35° C. or less and a nitrogen concentration of 1 vol % or more, and
    a total electric charge applied in the anodic electrolysis is 5 C/dm$^2$ to 60 C/dm$^2$.

6. The production method for a stainless steel sheet for fuel cell separators according to claim 5, further comprising
    after the anodic electrolysis, subjecting the annealed sheet to Cr condensation treatment, the Cr condensation treatment being immersion in an oxidizing solution or electrolysis in a potential range in which the stainless steel sheet is passivated.

7. The stainless steel sheet for fuel cell separators according to claim 2,
    wherein a ratio [Cr]/[Fe] of an atomic concentration of Cr existing in chemical form other than metal to an atomic concentration of Fe existing in chemical form other than metal at the steel sheet surface is 2.0 or more.

8. A production method for a stainless steel sheet for fuel cell separators, comprising:
    preparing a stainless steel sheet having the chemical composition according to claim 2, as a material;
    subjecting the stainless steel sheet to annealing, to obtain an annealed sheet; and
    subjecting the annealed sheet to anodic electrolysis,
    wherein an atmosphere in the annealing has a dew point of −35° C. or less and a nitrogen concentration of 1 vol % or more, and
    a total electric charge applied in the anodic electrolysis is 5 C/dm$^2$ to 60 C/dm$^2$.

9. The production method for a stainless steel sheet for fuel cell separators according to claim 8, further comprising
    after the anodic electrolysis, subjecting the annealed sheet to Cr condensation treatment, the Cr condensation treatment being immersion in an oxidizing solution or electrolysis in a potential range in which the stainless steel sheet is passivated C/dm$^2$.

10. The stainless steel sheet for fuel cell separators according to claim 1,
    wherein the chemical composition further contains, in mass %, one or more selected from
    Nb: 0.01% to 0.60%,
    Zr: 0.01% to 0.30%,
    V: 0.01% to 0.30%,
    Ca: 0.0003% to 0.0030%,
    Mg: 0.0005% to 0.0050%,
    B: 0.0003% to 0.0050%,
    REM: 0.001% to 0.100%,
    Sn: 0.001% to 0.500%, and
    Sb: 0.001% to 0.500%.

11. The stainless steel sheet for fuel cell separators according to claim 10,
wherein a ratio [Cr]/[Fe] of an atomic concentration of Cr existing in chemical form other than metal to an atomic concentration of Fe existing in chemical form other than metal at the steel sheet surface is 2.0 or more.

12. A production method for a stainless steel sheet for fuel cell separators, comprising:
preparing a stainless steel sheet having the chemical composition according to claim 10, as a material;
subjecting the stainless steel sheet to annealing, to obtain an annealed sheet; and
subjecting the annealed sheet to anodic electrolysis,
wherein an atmosphere in the annealing has a dew point of −35° C. or less and a nitrogen concentration of 1 vol % or more, and
a total electric charge applied in the anodic electrolysis is 5 $C/dm^2$ to 60 $C/dm^2$.

13. The production method for a stainless steel sheet for fuel cell separators according to claim 12, further comprising
after the anodic electrolysis, subjecting the annealed sheet to Cr condensation treatment, the Cr condensation treatment being immersion in an oxidizing solution or electrolysis in a potential range in which the stainless steel sheet is passivated $C/dm^2$.

14. The stainless steel sheet for fuel cell separators according to claim 1,
wherein a ratio [Cr]/[Fe] of an atomic concentration of Cr existing in chemical form other than metal to an atomic concentration of Fe existing in chemical form other than metal at the steel sheet surface is 2.0 or more.

15. A production method for a stainless steel sheet for fuel cell separators, comprising:
preparing a stainless steel sheet having the chemical composition according to claim 1, as a material;
subjecting the stainless steel sheet to annealing, to obtain an annealed sheet; and
subjecting the annealed sheet to anodic electrolysis,
wherein an atmosphere in the annealing has a dew point of −35° C. or less and a nitrogen concentration of 1 vol % or more, and
a total electric charge applied in the anodic electrolysis is 5 $C/dm^2$ to 60 $C/dm^2$.

16. The production method for a stainless steel sheet for fuel cell separators according to claim 15, further comprising
after the anodic electrolysis, subjecting the annealed sheet to Cr condensation treatment, the Cr condensation treatment being immersion in an oxidizing solution or electrolysis in a potential range in which the stainless steel sheet is passivated.

* * * * *